(12) United States Patent
Ogi et al.

(10) Patent No.: US 11,762,360 B2
(45) Date of Patent: Sep. 19, 2023

(54) SENSOR DEVICE, DATA ACQUISITION METHOD, AND CURRENT MONITORING SYSTEM

(71) Applicant: Hitachi, Ltd., Tokyo (JP)

(72) Inventors: Yuya Ogi, Tokyo (JP); Takuma Nishimura, Tokyo (JP); Kazuo Ono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 345 days.

(21) Appl. No.: 17/230,002

(22) Filed: Apr. 14, 2021

(65) Prior Publication Data

US 2021/0349436 A1    Nov. 11, 2021

(30) Foreign Application Priority Data

May 11, 2020  (JP) ................................. 2020-083018

(51) Int. Cl.
   *G05B 19/042*    (2006.01)
   *G06N 5/04*     (2023.01)
   *G06N 20/00*    (2019.01)

(52) U.S. Cl.
   CPC ........... *G05B 19/0428* (2013.01); *G06N 5/04* (2013.01); *G06N 20/00* (2019.01); *G05B 2219/24053* (2013.01)

(58) Field of Classification Search
   CPC ...... G05B 19/0428; G05B 2219/24053; G06N 5/04
   (Continued)

(56) References Cited

U.S. PATENT DOCUMENTS

2007/0268128 A1* 11/2007 Swanson .................. H04Q 9/00
                                                        340/539.22
2013/0297260 A1* 11/2013 Sato ....................... G01D 21/00
                                                        702/189
(Continued)

FOREIGN PATENT DOCUMENTS

JP            5-60596 A      3/1993
JP        2000-47714 A      2/2000
(Continued)

OTHER PUBLICATIONS

Chu, David, et al. "Approximate data collection in sensor networks using probabilistic models." 22nd International Conference on Data Engineering (ICDE'06). IEEE, 2006.pp. 1-12 (Year: 2006).*

(Continued)

*Primary Examiner* — Satish Rampuria
(74) *Attorney, Agent, or Firm* — MATTINGLY & MALUR, PC

(57) ABSTRACT

A sensor device includes: a sensor data acquisition unit that acquires sensor data of a measurement target from a sensor; a sensor data analysis unit that analyzes the data acquired by the sensor data acquisition unit; an extraction data setting unit that sets extraction conditions indicating a part desired to be extracted from among all the sensor data; a specific condition extraction unit that extracts a part from among all the sensor data based on an analysis result and the extraction conditions; and a user interface unit that allows a user to input/output information. Further, the user interface unit includes simple condition setting means by which a simple condition being at least one or more of the extraction conditions among the extraction conditions can be set in the sensor data analysis unit, and detection result display means that displays data satisfying the simple condition in the sensor data analysis unit.

9 Claims, 11 Drawing Sheets

(58) Field of Classification Search
USPC .................................................. 700/286–300
See application file for complete search history.

(56) References Cited

U.S. PATENT DOCUMENTS

| | | | | |
|---|---|---|---|---|
| 2015/0168979 A1* | 6/2015 | Fazel | ................... | G05B 15/02 |
| | | | | 700/297 |
| 2018/0011480 A1* | 1/2018 | Hiruta | ................ | G05B 23/0208 |
| 2018/0357201 A1* | 12/2018 | Ando | ....................... | G06N 3/08 |

FOREIGN PATENT DOCUMENTS

| JP | 2013-104795 A | 5/2013 |
|---|---|---|
| JP | 2016-58010 A | 4/2016 |
| WO | 2019/159249 A1 | 8/2019 |

OTHER PUBLICATIONS

Martin, Peter T., Yuqi Feng, and Xiaodong Wang. Detector technology evaluation. No. MPC Report No. 03-154. Fargo, ND, USA: Mountain-Plains Consortium, 2003.pp. 1-140 (Year: 2003).*

Sung, Wen-Tsai, Jui-Ho Chen, and Kung-Wei Chang. "Mobile physiological measurement platform with cloud and analysis functions implemented via IPSO." IEEE Sensors journal 14.1 (2013): pp. 111-123. (Year: 2013).*

Japanese Office Action received in corresponding Japanese Application No. 2020-083018 dated Mar. 7, 2023.

Japanese Office Action received in corresponding Japanese Application No. 2020-083018 dated Nov. 1, 2022.

* cited by examiner

SENSOR DEVICE, DATA ACQUISITION METHOD, AND CURRENT MONITORING SYSTEM

CLAIM OF PRIORITY

The present application claims priority from Japanese Patent application serial no. 2020-083018, filed on May 11, 2020, the content of which is hereby incorporated by reference into this application.

BACKGROUND OF THE INVENTION

1. Field of the Invention

The present invention relates to a sensor device, a data acquisition method, and a current monitoring system that are suitable for performing facility diagnosis using signals of sensors installed in various types of facility equipment.

2. Description of the Related Art

In various types of facility equipment used in various infrastructures, signals are taken out from installed sensors and the signals are monitored. Thereby, facility diagnosis such as abnormality diagnosis and life diagnosis of the facility equipment is performed.

For example, in machine factories and steel plants, a plurality of motors are used as facility equipment. For this diagnosis, in JP 2013-104795 A, in a carrier device that rotates a plurality of carrier rolls by driving a plurality of motors respectively to carry metal materials, each of the motors is diagnosed by measuring the load current of the motor with a current sensor.

SUMMARY OF THE INVENTION

In the carrier device described in JP 2013-104795 A, an abnormality of the motor is diagnosed by performing an absolute value comparison process, an average value comparison process, and a relative value comparison process of the load current detected by the sensor. At this time, as a threshold value for determining the presence of abnormality, a preset threshold value corresponding to the facility specification and the like is used. In addition, there are individual differences between carrier units, and the threshold values are set according to the individual differences.

However, JP 2013-104795 A describes neither a method of determining the threshold value according to the individual differences nor a method of acquiring sensor data. Further, when a motor is diagnosed, the current of the motor needs to be detected under specific conditions for diagnosis. However, in the carrier device described in JP 2013-104795 A, the existing material presence determination unit and speed status determination unit that are different from the current sensor are used for detection under specific conditions, causing the usability to be lowered. In order to constantly diagnose and monitor the motor in operation, only a part that satisfies the specific conditions needs to be extracted from the sensor data of the sensor in operation.

The present invention has been made in view of the above-described problem, and an object of the present invention is to provide a sensor device, a data acquisition method, and a current monitoring system that can easily determine extraction conditions indicating a part desired to be extracted from among sensor data acquired by a sensor data acquisition unit and that can improve the usability.

From the above, the present invention is "a sensor device including: a sensor data acquisition unit that acquires sensor data of a measurement target from a sensor; a sensor data analysis unit that analyzes the data acquired by the sensor data acquisition unit; an extraction data setting unit that sets extraction conditions indicating a part desired to be extracted from among all the sensor data acquired by the sensor data acquisition unit; a specific condition extraction unit that extracts a part from among all the sensor data acquired by the sensor data acquisition unit, based on an analysis result of an analysis made by the sensor data analysis unit and the extraction conditions from the extraction data setting unit; and a user interface unit that allows a user to input and output information, and further, the user interface unit includes: simple condition setting means by which a simple condition being at least one or more of the extraction conditions among the extraction conditions can be set in the sensor data analysis unit; and detection result display means that displays data satisfying the simple condition in the sensor data analysis unit."

Further, the present invention is "a current monitoring system including a plurality of current sensor devices and a management device connected to each of the current sensor devices, and each of the current sensor devices includes: a sensor data acquisition unit that acquires data from a plurality of sensors; a sensor data analysis unit that analyzes the data acquired by the sensor data acquisition unit; an extraction data setting unit that sets extraction conditions indicating a part desired to be extracted from among all the sensor data acquired by the sensor data acquisition unit; a specific condition extraction unit that extracts a part from among all the sensor data acquired by the sensor data acquisition unit, based on an analysis result of an analysis made by the sensor data analysis unit and the extraction conditions from the extraction data setting unit; an extraction result analysis unit that analyzes the sensor data extracted by the specific condition extraction unit; a communication unit that outputs data analyzed by the extraction result analysis unit; and a user interface unit that allows a user to input and output information, and further, the user interface unit includes: simple condition setting means by which a simple condition being at least one or more of the extraction conditions among the extraction conditions can be set in the sensor data analysis unit; and detection result display means that only displays data that satisfies the simple condition in the sensor data analysis unit, and still further, the management device performs predetermined processing based on the data extracted that is received from each of the current sensor devices, and outputs a result of performing the processing."

Further, the present invention is "a data acquisition method including: acquiring sensor data of a measurement target from a sensor; analyzing the acquired data; setting extraction conditions indicating a part desired to be extracted from among all the sensor data acquired; extracting a part from among all the sensor data acquired, based on an analysis result and the extraction conditions; prompting a user to set a simple condition that is at least one or more of the extraction conditions among the extraction conditions; and presenting data that satisfies the simple condition."

According to the present invention, the extraction conditions indicating the part desired to be extracted from among the sensor data acquired by the sensor data acquisition unit can be easily determined, and the usability can be improved.

DESCRIPTION OF THE PREFERRED EMBODIMENTS

Hereinafter, embodiments of the present invention are described with reference to the drawings. The following description is for explaining one embodiment of the present invention and does not limit the scope of the present invention. Therefore, those skilled in the art can adopt embodiments in which respective elements or all of the elements are replaced with equivalent ones, and these embodiments are also included in the scope of the present invention.

As will be described later, the present embodiment is described with an example realizing a current monitoring system 1 including a current sensor device 2 that can acquire current waveforms on a plurality of channels and perform calculation on the current waveforms and a management device 3 that can acquire calculation results from the plurality of current sensor devices 2 and process the calculation results. The present embodiment can be applied not only to a motor used in a steelmaking plant, but also to, for example, a motor provided in a train car.

First Embodiment

Figure 1:
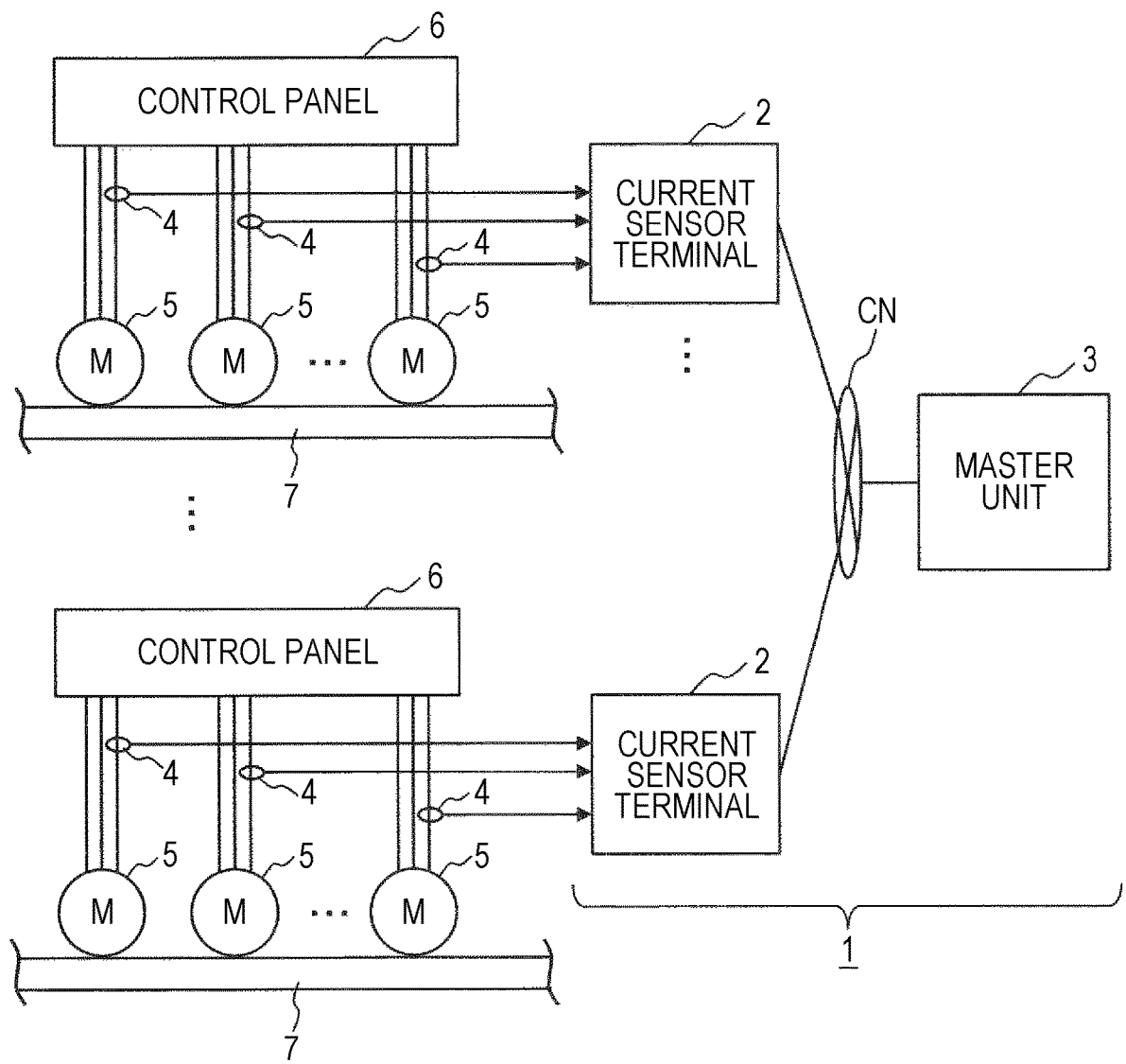
FIG. 1 is a diagram showing an overall configuration example of a current monitoring system according to a first embodiment.

A first embodiment is described with reference to FIGS. 1 to 8. FIG. 1 shows an overall configuration example of the current monitoring system 1. The current monitoring system 1 of FIG. 1 includes a master unit 3 as the management device and current sensor terminals 2 as the plurality of sensor devices connected to the master unit 3 via a communication network CN. The communication network CN may be wired communication or wireless communication.

Each current sensor terminal 2 includes computer resources (all not shown) such as a microprocessor, an application specific integrated circuit (ASIC), a memory, an input/output interface circuit, and a communication interface circuit.

The current sensor terminal 2 is connected to a plurality of current sensors 4. Each current sensor 4 measures the load current of a motor 5 and transmits the measured value to the current sensor device 2.

Each motor 5 is used to roll and convey steel 7. The control panel 6 controls energization of each motor 5. Each current sensor 4 can also measure the load current of the motor 5 inside the control panel 6 that controls the energization of the motor 5.

Figure 2:
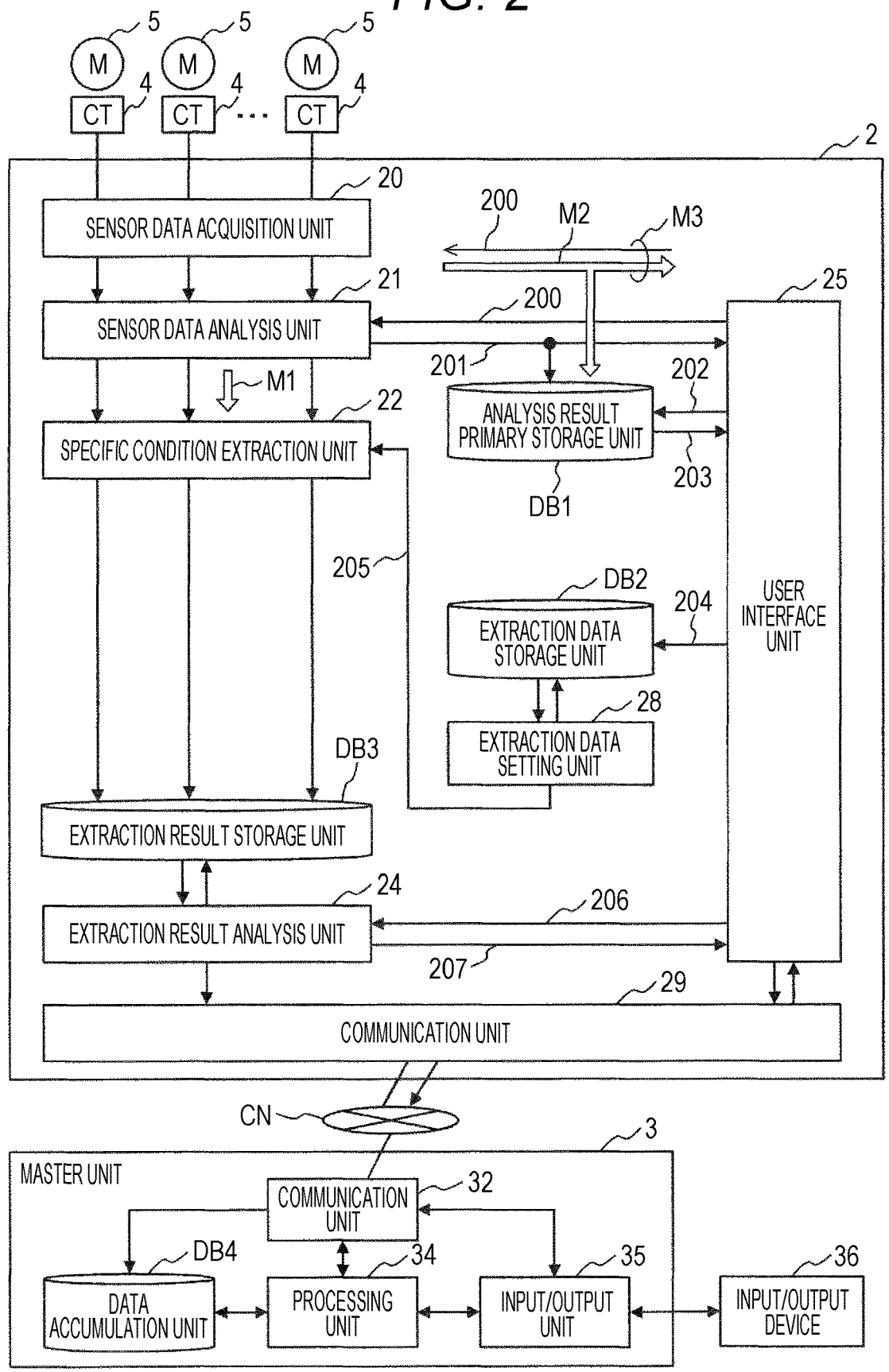
FIG. 2 is a diagram showing a functional configuration of the current monitoring system.

An example of a functional configuration of the current monitoring system 1 is described with reference to FIG. 2. First, the configuration example of the current sensor terminal 2 is described. The current sensor terminal 2 receives an instruction given by a user from the master unit 3, gives an instruction to each unit, acquires and analyzes detected values (current values) from the plurality of current sensors 4, and transmits the analysis result together to the master unit 3 together with the edited screen.

The current sensor terminal 2 uses the above-described computer resources and software resources (not shown) such as control programs, to realize, for example, a sensor data acquisition unit 20, a sensor data analysis unit 21, a specific condition extraction unit 22, an extraction result storage unit DB3, an extraction result analysis unit 24, a user interface unit 25, an analysis result primary storage unit DB1, an extraction data storage unit DB2, an extraction data setting unit 28, and a communication unit 29.

Among the above units, the user interface unit 25 carries the functions of receiving an instruction given by the user via the communication unit 29 from the master unit 3, giving an operation instruction to each unit in the current sensor terminal 2, creating a screen in which a processing result is edited and reflected, and transmitting the screen together with the acquired data via the communication unit 29 to the master unit 3. Examples of screen configurations created by the user interface unit 25 are shown in FIGS. 3, 5 to 8, and details of these are described later.

The sensor data acquisition unit 20 constantly reads the detection signal (detection value) from each current sensor 4 at predetermined intervals, converts the read detection signal into digital data if the detected signal is an analog signal, and then transmits the signal to the sensor data analysis unit 21.

The sensor data analysis unit 21 has three operation modes, that is, a normal analysis mode M1, a temporary analysis mode M2, and a feature quantity acquisition mode M3, and these are operation modes that operate independently of each other.

The normal analysis mode M1 of the sensor data analysis unit 21 performs analysis processing that extracts various feature quantities described later with respect to the detection signal from the sensor data acquisition unit 20. The analysis result of the processing is transmitted to the specific condition extraction unit 22 together with the detection signal detected by the sensor data acquisition unit 20.

Next, the temporary analysis mode M2 of the sensor data analysis unit 21 is described. After receiving a not-shown temporary acquisition start signal from the user interface unit 25, the sensor data analysis unit 21 transmits various feature quantities described later to the user interface unit 25 for a predetermined period, and meanwhile, stores the feature quantities in the analysis result primary storage unit DB1.

Next, the feature quantity acquisition mode M3 of the sensor data analysis unit 21 is described. The sensor data analysis unit 21 receives, from the user interface unit 25, a simple condition 200 which is at least one or more of extraction conditions 205 among the extraction conditions 205. Note that the extraction conditions 205 are conditions indicating a part desired to be extracted among the sensor data acquired by the sensor data acquisition unit 20. The sensor data analysis unit 21 transmits a simple analysis result 201, which is a feature quantity satisfying the simple condition 200, to the user interface unit 25, and meanwhile, stores the simple analysis result 201 in the analysis result primary storage unit DB1. Details of the operations of the sensor data analysis unit 21 and the user interface unit 25 are described later in FIGS. 3 to 7.

Now, the feature quantity mentioned above is described. The feature quantity is defined as a term indicating any one of later-described feature quantities: a feature quantity group 1 (feature quantities A to C displayed on a screen 40B in FIG. 5); a feature quantity group 2 (feature quantities D to F displayed on a screen 40C in FIG. 6); and a feature quantity group 3 (feature quantities G to I displayed on a screen 40D in FIG. 7).

Figure 5:
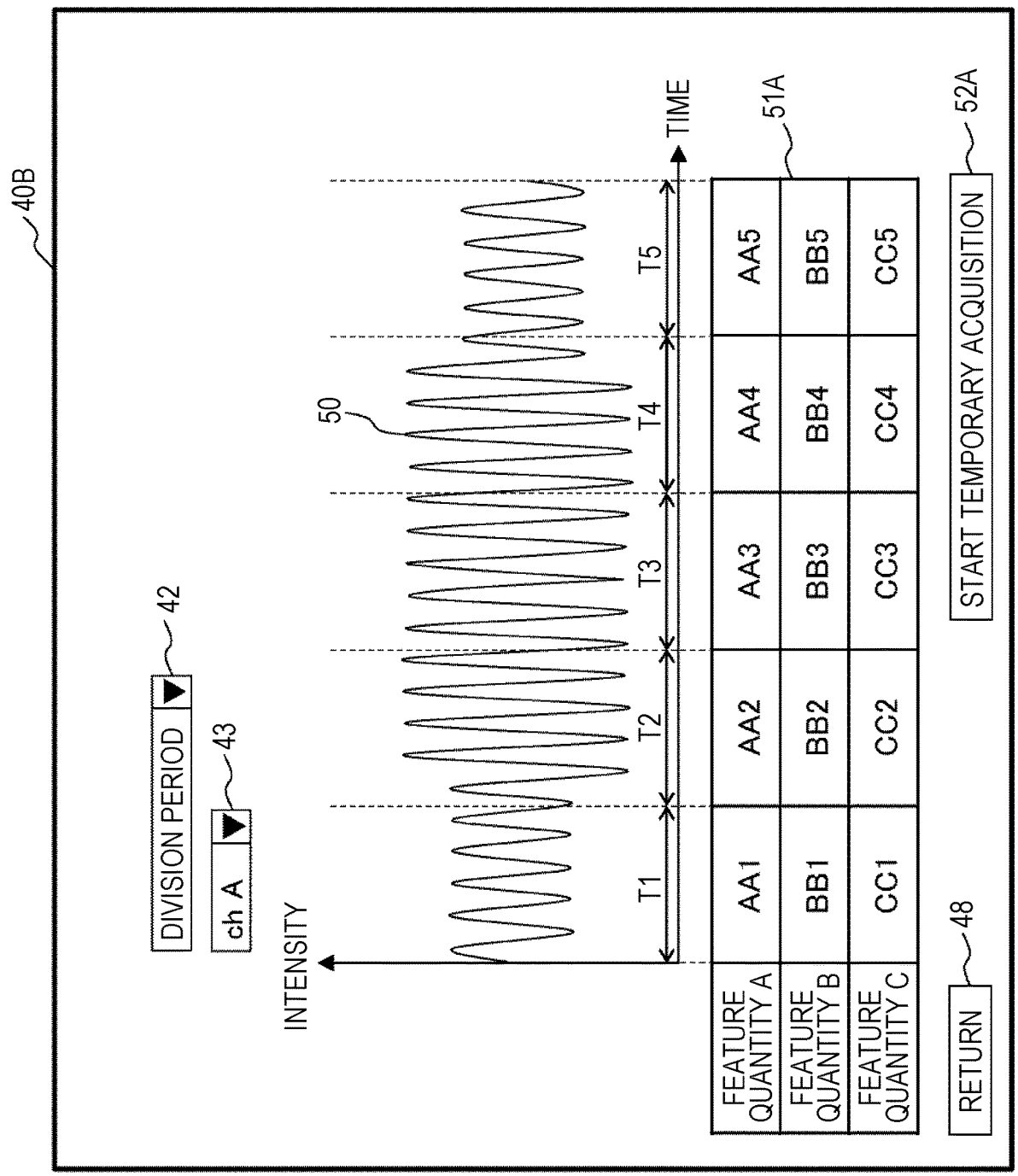
FIG. 5 is a diagram showing an example of a time series data display screen according to the first embodiment.
Figure 6:
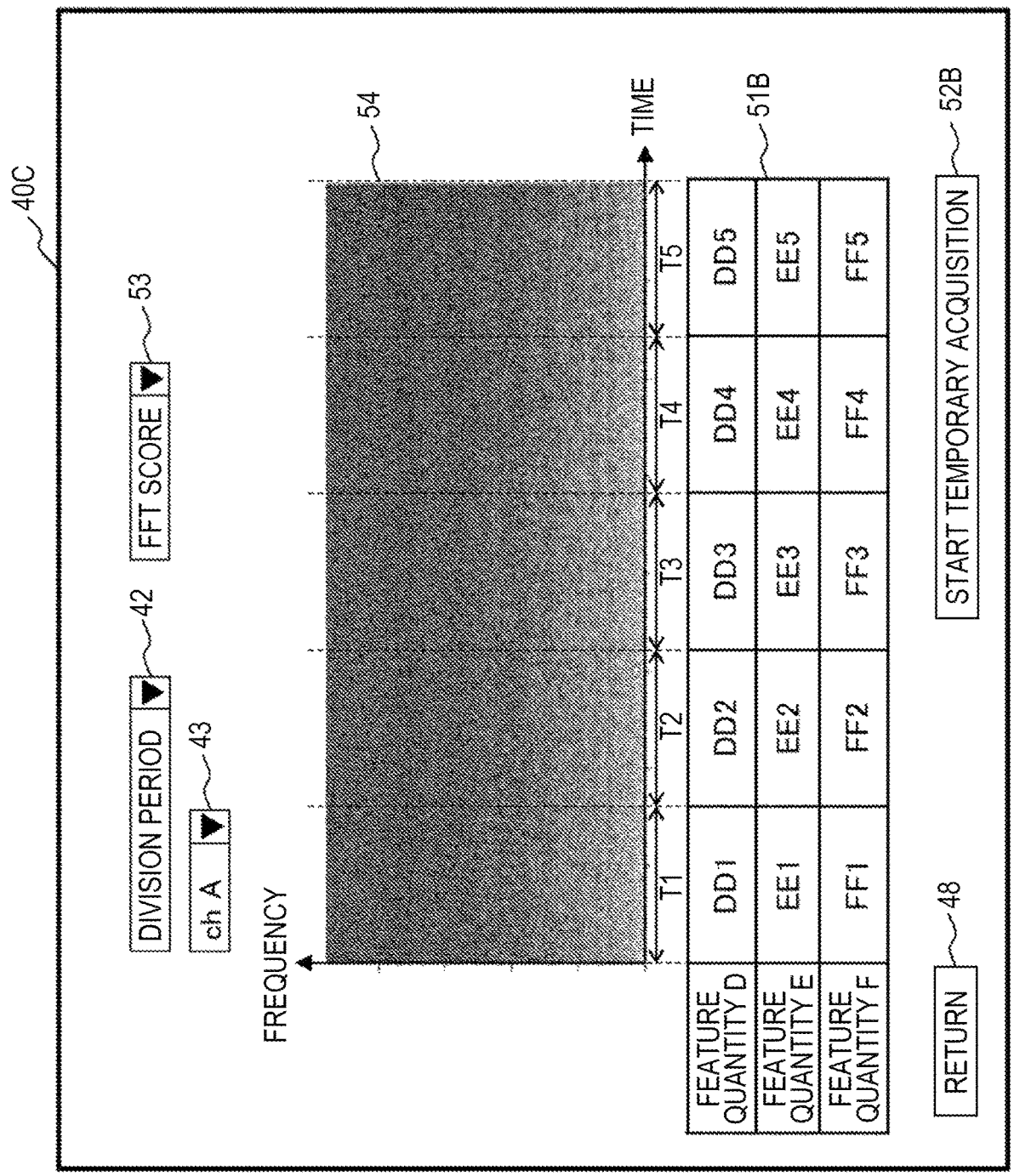
FIG. 6 is a diagram showing an example of a spectrogram display screen according to the first embodiment.
Figure 7:
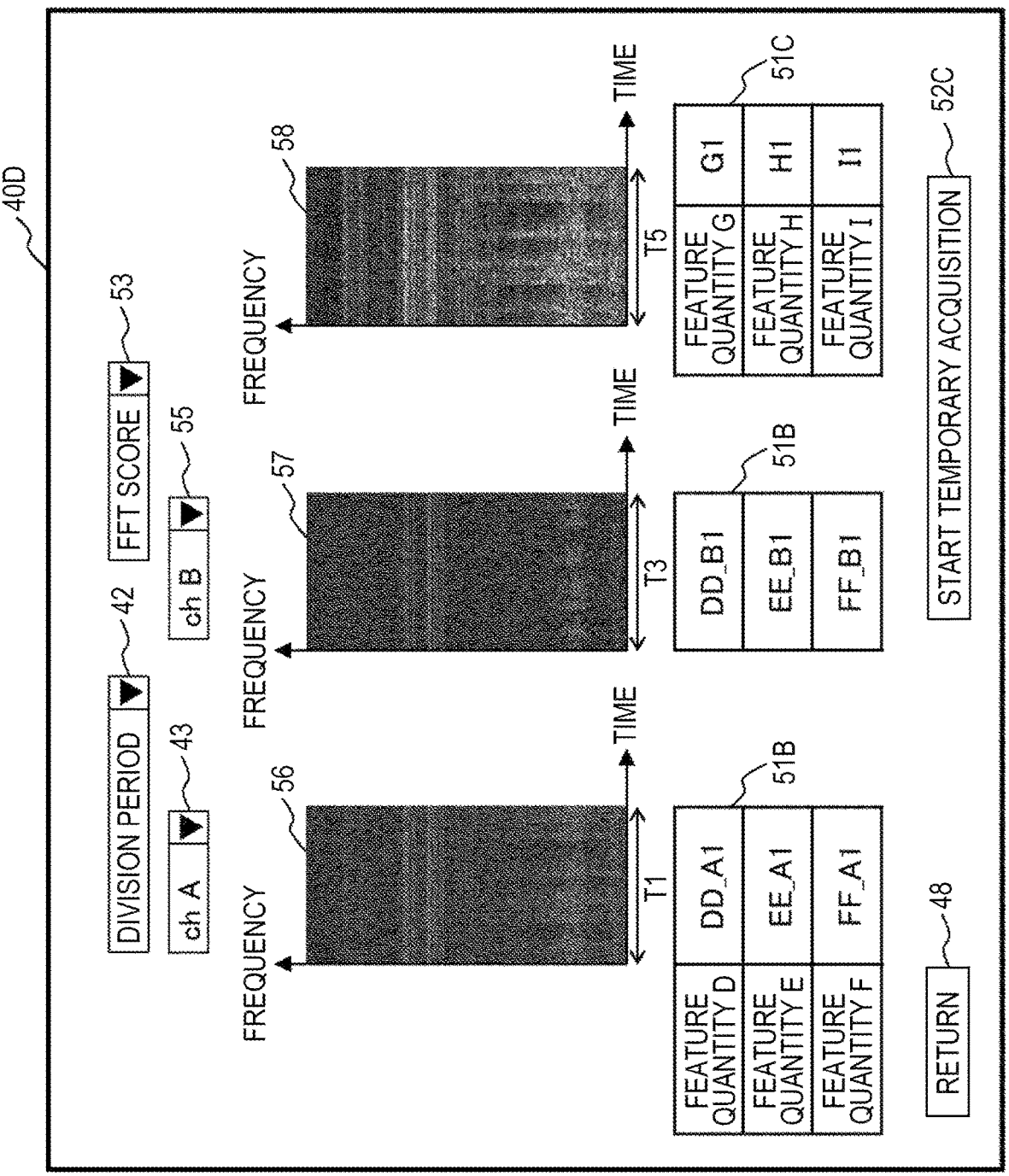
FIG. 7 is a diagram showing an example of a spectrogram comparison display screen according to the first embodiment.

Additionally, the feature quantities A to C in FIG. 5 represents, regarding a wavy data 50 captured from the sensor, the feature quantities A to C indicated in the data 50 for each predetermined period T (T1 to T5) in different viewpoints, and in a table 51A, numerical data indicated by the feature quantities A to C are written. FIG. 6 shows the feature quantities indicated by spectrogram data 54 obtained by Fourier transforming the wavy data 50 of each period, as the feature quantities D to F for the feature quantities A to C, respectively. In a table 51B, numerical data of the spectrogram indicated by the feature quantities D to F after the Fourier transform are written. In FIG. 7, the feature quantities D to F in FIG. 6 are further processed, and only data 56, 57, and 58 for a part of the period are extracted and used as new feature quantities. As described above, all the feature quantities extracted before and after various types of processing and conversions are defined as feature quantities.

Returning to FIG. 2, upon receiving the analysis result (feature quantity) transmitted from the sensor data analysis unit 21 by executing the normal analysis mode M1 and the extraction conditions 205 transmitted from the extraction data setting unit 28 described later, the specific condition extraction unit 22 determines whether the extraction conditions 205 are satisfied for the analysis result (feature quantity). Upon detecting that the extraction conditions 205 are satisfied, the specific condition extraction unit 22 stores a part of the detection signal detected by the sensor data acquisition unit 20 in the extraction result storage unit DB3 as an extraction result. For example, in the case of the feature quantity shown in FIG. 5, when the extraction conditions are satisfied for the feature quantity A (content is AA1) at time T1, the wavy data 50 at the time T1 is stored in the extraction result storage unit DB3.

Extraction data 204 is stored in the extraction data storage unit DB2 by the user interface unit 25. The extraction data setting unit 28 reads the extraction data 204 from the extraction data storage unit DB2, creates the extraction conditions 205, and transmits the extraction conditions 205 to the specific condition extraction unit 22. Note that the extraction data 204 is data in which thresholds for at least one or more feature quantities are described, or a learning data set for machine learning or deep learning. As a result, in the previous example, for the feature quantity A (content is AA1) at the time T1, a threshold value for comparing AA1 with the above threshold value is set.

The extraction result analysis unit 24 reads the extraction result stored in the extraction result storage unit DB3, performs an analysis such as for diagnosing the motor 5 and for the number of extractions per day or hour, and transmits the analysis result to the communication unit 29. It is desirable that the result of the above analysis include information on a period during which continuous extraction has not been achieved. By notifying the master unit 3 of this information via the communication unit 29, it becomes possible to indicate to the user a notification prompting the user to reset the extraction conditions when the extraction has not been performed for a long period.

Further, the extraction result analysis unit 24 receives a detailed analysis result request signal 206 from the user interface unit 25. Upon receiving the detailed analysis result request signal 206, the extraction result analysis unit 24 transmits a detailed analysis result 207 to the user interface unit 25. Note that the detailed analysis result 207 is, for example, the result of diagnosing the motor 5, the extraction result stored in the extraction result storage unit DB3, and the number of extractions per day or hour.

Figure 8:
FIG. 8 is a diagram showing an example of a detailed analysis result display screen according to the first embodiment.

FIG. 8 shows an example of a screen 40E that displays the detailed analysis result 207 among the screens edited and created by the user interface unit 25. By graphing the number of extractions per day as shown in FIG. 8, it becomes possible to visualize whether or not the extraction can be performed under the set extraction conditions. The display content can be switched to the data of an appropriate channel (for example, a current sensor) by the selection operation of a channel selection part 43 before being displayed.

Returning to FIG. 2, the communication unit 29 transmits the result analyzed by the extraction result analysis unit 24 and a display screen 40 generated by the user interface unit 25 to the master unit 3 via the communication network CN, and meanwhile, receives the signal from the master unit 3 and exchanges information with the user interface unit 25.

A configuration example of the master unit 3 is described. The master unit 3 also uses computer resources such as a microprocessor, a memory, and a communication interface, and software resources such as a diagnostic program (all not shown), to realizes, for example, a communication unit 32, a data accumulation unit DB4, a processing unit 34, and an input/output unit 35.

The communication unit 32 is connected to each current sensor terminal 2 via the communication network CN. The data accumulation unit DB4 accumulates the results analyzed by the extraction result analysis unit 24 which have been received by the communication unit 32 from each current sensor terminal 2.

The processing unit 34 executes predetermined processing based on the result analyzed by the extraction result analysis unit 24 and accumulated in the data accumulation unit DB4. The predetermined processing includes, for example, detecting the presence of an abnormality in the motor 5 to be diagnosed, predicting the service life, and notifying the user of not being able to perform extraction for a long period by transmitting an e-mail. That is, the predetermined processing can include any one or a plurality of abnormality detection processing, service life prediction processing, diagnosis processing, notification processing to the user and others.

The input/output unit 35 outputs the screen 40 created by the user interface unit 25 to an input/output device 36 via the communication network CN, and meanwhile, allows the information to be exchanged between the user and the user interface unit 25 via the input/output device 36. The input/output device 36 may be, for example, a personal computer of such as a desktop type, a notebook type, or a tablet type, or a so-called wearable terminal of a wristwatch type or a glasses type. The input/output device 36 may include an output device (such as display) for displaying the information received from the master unit 3 and an input device (such as keyboard and touch pane) for inputting the information to the master unit 3. A plurality of input/output devices 36 may be connected to one master unit 3, and the motor 5 may be monitored from a plurality of locations at the same time.

Next, the details of the operations of the sensor data analysis unit 21 and the user interface unit 25 are described with reference to FIGS. 3 to 7. FIG. 3 and FIGS. 5 to 7 are examples of the display screens 40 generated by the user interface unit 25 and displayed on the input/output device 36 of the master unit 3 via communication. Note that these screens 40 are not merely display screens, but also have an operation screen function that allows the display contents to be changed or operation instructions to be given by such as a touch panel or pointer instructions. Therefore, the user makes various inputs from the master unit 3 side while checking the screen displayed on the input/output device 36 of the master unit 3.

Figure 3:
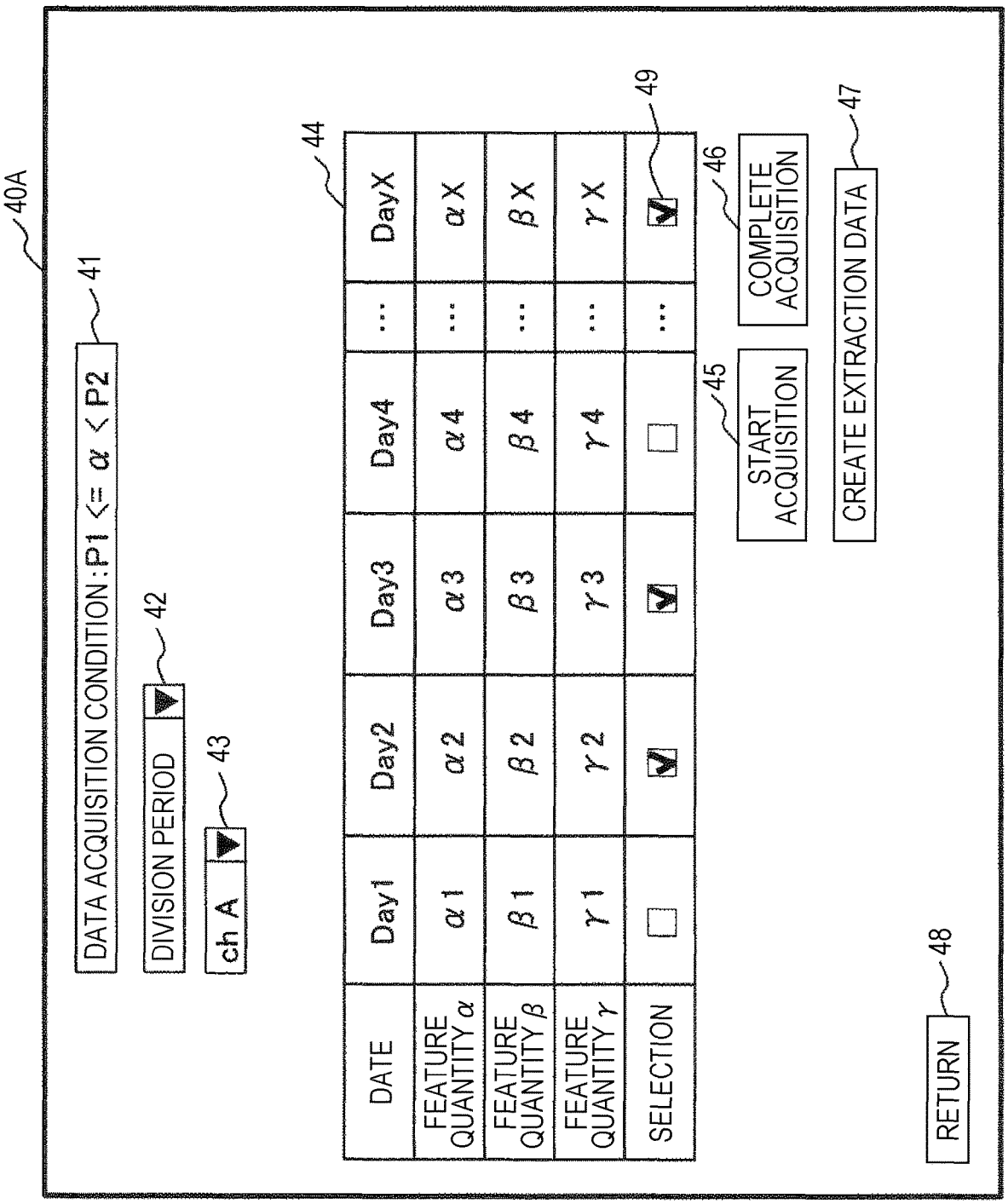
FIG. 3 is a diagram showing an example of a simple condition setting screen according to the first embodiment.

FIG. 3 is a simple condition setting screen 40A, FIG. 5 is a time series data display screen 40B, FIG. 6 is a spectrogram display screen 40C, and FIG. 7 is a spectrogram comparison display screen 40D. FIGS. 5 to 7 are display screens for displaying various feature quantities by feature quantity display means (monitor) in the user interface unit 25. It should be noted that these display screens 40 can be switched from the top page generated by the not-shown user interface unit 25.

A simple condition setting screen 40A of FIG. 3 is constituted of, for example, simple condition setting means including a simple condition setting part 41, a division period setting part 42, and the channel selection part 43, and a simple analysis result display part 44 (detection result display means) that displays the simple analysis result 201 satisfying the simple condition 200, an acquisition start button 45, an acquisition completion button 46, an extraction data creation button 47, a return button 48 to return to the top page, and a check box 49 being extraction data use/unuse selection means.

The simple condition setting part 41 determines a threshold value for at least one feature quantity. In the example of FIG. 3, the simple condition of P1 or more and less than P2 is set for the feature quantity α, and when this condition is satisfied, the simple analysis result 201 is added to the simple analysis result display part 44.

The division period setting part 42 determines a processing time unit T in the sensor data analysis unit 21. For example, when T=10 seconds is selected, the sensor data analysis unit 21 performs analysis every 10 seconds and determines whether or not the analysis result satisfies the condition set by the simple condition setting part 41.

The channel selection part 43 determines to which one of the current sensors 4 connected to the current sensor device 2 the condition set by the simple condition setting part 41 is applied. Note that the channel selection part 43 can not only select only one channel but also select all the current sensors 4 connected to the current sensor device 2.

Needless to say, when different threshold values are desired to be set for a plurality of channels, a not-shown setting button may be used, or a simple condition setting file may be used separately.

The simple analysis result display part 44 is constituted of, for example, a date (or time) when the sensor data analysis unit 21 created the simple analysis result 201, at least one feature quantity, and a selection column including the check box 49.

Next, the processing procedure of the sensor data analysis unit 21 and the user interface unit 25 when the simple analysis result 201 is added to the simple analysis result display part 44 is described with reference to the flowchart of FIG. 4. First, initial settings are made in processing steps S11 to S13. By inputting a set value in the simple condition setting screen 40A of the input/output device 36, the user can change the operation content of each current sensor terminal 2 or give an operation instruction via the master unit 3.

In the initial setting stage, the user sets a threshold value for at least one or more feature quantities in the simple condition setting part 41 of the simple condition setting screen 40A (processing step S11). For example, as shown in FIG. 3, P1 or more and less than P2 is set as a simple condition for a feature quantity α. Further, the user sets desired values in the division period setting part 42 and the channel selection part 43 (processing step S12). The user interface unit 25 transmits the simple condition 200 determined in the processing step S11 and the processing step S12 to the sensor data analysis unit 21. Next, when the user presses the acquisition start button 45 (processing step S13), the process proceeds to processing step S14.

When the user presses the acquisition start button 45, the user interface unit 25 transmits a not-shown analysis start signal to the sensor data analysis unit 21. Upon receiving the analysis start signal, the sensor data analysis unit 21 activates the feature quantity acquisition mode M3 and continues the analysis until receiving a not-shown analysis end signal from the user interface unit 25.

The user interface unit 25 determines whether or not the acquisition completion button 46 is pressed by the user (processing step S14). If the acquisition completion button 46 is not pressed, the sensor data analysis unit 21 acquires the detection signal from the sensor data acquisition unit 20 for the period (T) set in the simple condition 200 (processing step S15). After that, the sensor data analysis unit 21 calculates at least one feature quantity from the acquired sensor data (processing step S16), and determines whether or not the calculated feature quantity satisfies the simple condition 200 (processing step S17). In the case of FIG. 3, the feature quantity α, a feature quantity β, and a feature quantity γ are calculated and it is determined whether the feature quantity α is P1 or more and less than P2.

When the calculated feature quantity satisfies the simple condition 200, the sensor data analysis unit 21 transmits the simple analysis result 201 to the user interface unit 25, and meanwhile, stores the simple analysis result 201 in the analysis result primary storage unit DB1. If the calculated feature quantity does not satisfy the simple condition 200, the sensor data analysis unit 21 does not execute any processing and proceeds to the processing step S14.

The user interface unit 25 receives the simple analysis result 201 from the sensor data analysis unit 21 and adds the result to the simple analysis result display part 44 (processing step S18). In the case of Day4 in FIG. 3, α4, β4, and γ4 are added. After that, the processing proceeds to the processing step S14, and the processing steps S14 to S18 are repeated until the acquisition completion button 46 is pressed. By repeating this series of operations, α1, α2, α3, etc., which are P1 or more and less than P2, are lined up in the feature quantity α column in the simple analysis result display part 44, and the feature quantity β and the feature quantity γ, which are other feature quantities in the case when the above values are acquired, are listed.

When the acquisition completion button 46 is pressed, the user interface unit 25 transmits the not-shown analysis end signal to the sensor data analysis unit 21. Upon receiving the analysis end signal, the sensor data analysis unit 21 ends the feature quantity acquisition mode M3. As a result, a series of processing is ended.

The user can acquire the value of the simple analysis result display part 44 on the simple condition setting screen 40A of each current sensor terminal 2 from the input/output device 36 via the master unit 3. By doing so, information on the other feature quantity β and the feature quantity γ in the case when the feature quantity α satisfies the simple condition 200 can be obtained. By using this information, the user can easily determine a compound condition, and can easily create the extraction data 204 and the extraction conditions 205 indicating the part desired to be extracted from among the sensor data acquired by the sensor data acquisition unit. Note that instead of acquiring the value of the simple analysis result display part 44, the user may acquire a simple analysis result file 203 by transmitting a readout signal 202 to the analysis result primary storage unit DB1 via the user interface unit 25.

Next, method and purpose of using the time series data display screen 40B are described. The time series data display screen 40B of FIG. 5 is constituted of, for example, the division period setting part 42, the channel selection part 43, the return button 48, time series data 50, a temporary analysis result display part 51A, and a temporary acquisition start button 52A. When the temporary acquisition start button 52A is pressed, the user interface unit 25 transmits a not-shown temporary acquisition start signal to the sensor data analysis unit 21.

Upon receiving the temporary acquisition start signal, the sensor data analysis unit 21 activates the temporary analysis mode M2, transmits various feature quantities to the user interface unit 25 for a predetermined period, and meanwhile, stores the feature quantities in the analysis result primary storage unit DB1.

The time series data display screen 40B in FIG. 5 displays a result obtained by measuring, in real time, the load current of the motor 5 in operation, for an optional time period from the time when the temporary acquisition start button 52A is pressed, in the time series data display 50 and the temporary analysis result display part 51A. By doing so, when the current sensor device 2 is newly installed at the operating site, information for setting the simple condition 200 can be obtained at the operating site.

For example, in the case of FIG. 5, when a part where the load current is maximum during the period T set by the division period setting part 42 is desired to be extracted, by looking at a shape of the time series data 50 and the feature quantity group 1 (the feature quantities A to C in FIG. 5), it becomes easy to target the simple condition 200 to the vicinity of AA3 (or BB3 or CC3).

Now, the feature quantity group 1 is described. The feature quantity group 1 is a feature quantity obtained without performing conversion processing such as frequency analysis such as fast Fourier transform (FFT) on the sensor data acquired by the sensor data acquisition unit 20. For example, the feature quantity can include any one or more of the maximum amplitude of a current waveform, the average amplitude of a current waveform, a noise level of a signal, a differential value in an optional time unit, and an integral value in an optional time unit. Further, in the temporary analysis result display part 51A in FIG. 5, the feature quantity group 1 is shown as the feature quantities A to C, but it is needless to say that the number is not necessarily limited to three, and any one or more of the feature quantities may be included in the feature quantity group 1.

Next, method and purpose of using the spectrogram display screen 40C are described. The spectrogram display screen 40C of FIG. 6 is constituted of, for example, the division period setting part 42, the channel selection part 43, the return button 48, an FFT score setting part 53, a spectrogram 54, the temporary analysis result display part 51B, and the temporary acquisition start button 52B.

When the temporary acquisition start button 52B is pressed, the user interface unit 25 transmits a temporary acquisition start signal, which is not shown, to the sensor data analysis unit 21. Upon receiving the temporary acquisition start signal, the sensor data analysis unit 21 activates the temporary analysis mode M2, transmits various feature quantities to the user interface unit 25 for a predetermined period, and meanwhile, stores the feature quantities in the analysis result primary storage unit DB1. The FFT score setting part 53 sets the FFT score when the spectrogram 54 is created.

The spectrogram display screen 40C in FIG. 6 displays the spectrogram 54, which is a result obtained by measuring in real time the load current of the motor 5 in operation for an optional time period from the time when the temporary acquisition start button 52B is pressed and by performing the short time Fourier transform, and the feature quantity group 2 in the temporary analysis result display part 51B. By doing so, when the current sensor device 2 is newly installed at the operating site, information for setting the simple condition 200 can be obtained at the operating site. As a method for creating the spectrogram 54, a method using a bandpass filter group may be used.

For example, in the case of FIG. 6, by looking at a characteristic shape of the frequency component in the spectrogram 54 and the feature quantity group 2 (feature quantities D to F in FIG. 6), it becomes possible to target the simple condition 200.

Now, the feature quantity group 2 is described. The feature quantity group 2 is a feature quantity obtained after performing conversion processing such as frequency analysis of the spectrogram 54 or the like on the sensor data acquired by the sensor data acquisition unit 20. For example, the feature quantity can include any one or more of a frequency having the Nth intensity in an optional period and an intensity of that frequency (N is a natural number starting from 1), an intensity of an optional frequency, a frequency with the largest change in an optional period and an intensity of that frequency, and a similarity with a learned pattern. Further, in the temporary analysis result display part 51B in FIG. 6, the feature quantity group 2 is shown as the feature quantity D to F, but it is needless to say that the number is not necessarily limited to three, and any one or more of the feature quantities may be included in the feature quantity group 2.

Next, method and purpose of using the spectrogram comparison display screen 40D are described.

The spectrogram comparison display screen 40D of FIG. 7 is constituted of, for example, the division period setting part 42, the channel selection part 43, a second channel selection part 55, the return button 48, the FFT score setting part 53, a first spectrogram 56, a second spectrogram 57, a third spectrogram 58, the temporary analysis result display part 51B, a temporary analysis result display part 51C, and a temporary acquisition start button 52C. When the temporary acquisition start button 52C is pressed, the user interface unit 25 transmits a not-shown temporary acquisition start signal to the sensor data analysis unit 21.

Upon receiving the temporary acquisition start signal, the sensor data analysis unit 21 activates the temporary analysis mode M2, transmits various feature quantities to the user interface unit 25 for a predetermined period, and meanwhile, stores the feature quantities in the analysis result primary storage unit DB1.

The spectrogram comparison display screen 40D in FIG. 7 displays the first spectrogram 56 and the second spectrogram 57, which are results obtained by measuring in real time the load current of the motor 5 in operation for an optional time period from the time when the temporary acquisition start button 52C is pressed and by performing the short time Fourier transform, and the feature quantity group 2 in the temporary analysis result display part 51B. Note that the first spectrogram 56 corresponds to the current sensor 4 selected by the channel selection part 43, and the second spectrogram 57 corresponds to the current sensor 4 selected by the second channel selection part 55. In addition, the temporary analysis result display part 51C displays the third spectrogram 58 obtained by subtracting the second spectrogram 57 from the first spectrogram 56, and the feature quantity group 3. By doing so, when the current sensor device 2 is newly installed at the operating site, information for setting the simple condition 200 can be obtained at the operating site. As a method for creating the spectrogram 54, a method using a bandpass filter group may be used.

For example, in the case of FIG. 7, by looking at a characteristic shape of the frequency component in the third spectrogram 58 and the feature quantity group 3 (feature quantities G to I in FIG. 7), it becomes possible to target the simple condition 200.

Now, the feature quantity group 3 is described. The feature quantity group 3 is a feature quantity obtained by performing conversion processing such as frequency analysis of the spectrogram 57 or the like on the sensor data acquired by the sensor data acquisition unit 20 using the different current sensors 4 and then calculating the difference between the processing results of the current sensors. For example, the feature quantity can include any one or more of the maximum amount of change between the different current sensors 4, the frequency at which the change between the different current sensors 4 is maximum, the similarity between the different current sensors 4, and the similarity between the third spectrogram 58 and the learned pattern. Further, in the temporary analysis result display part 51C in FIG. 7, the feature quantity group 3 is shown as the feature quantity G to I, but it is needless to say that the number is not necessarily limited to three, and any one or more of the feature quantities may be included in the feature quantity group 3.

The display screens shown in FIGS. 5 to 7 have described a configuration in which the feature quantity is received from the sensor data analysis unit 21 by pressing the temporary acquisition start button 52A to 52C and the display screen is updated, but the configuration is not limited to this. More specifically, the return button 48 may be used to move to a not-shown top page to switch between the display screens. By doing so, for example, after the time series data 50 is confirmed on the time series data display screen 40B, the spectrogram 54 of the confirmed time series data 50 can be confirmed by displaying the spectrogram display screen 40C.

In the present embodiment, as described above, by setting the simple condition 200, the extraction conditions 205 indicating the part desired to be extracted from among the sensor data acquired by the sensor data acquisition unit 20 can be easily determined. Further, by having a display screen for displaying various feature quantities, the usability of the user can be improved. According to the present embodiment, even when the operating time of the motor 5 is long and the period during which data suitable for diagnosis can be extracted is limited, the specific condition extraction unit 22 can automatically extract the detection signal under the extraction conditions and the extraction result analysis unit 24 can perform calculation.

Therefore, the present embodiment can be suitably used for, for example, abnormality detection or diagnosis of a motor used in a steelmaking plant. It is because, in the steelmaking plant that continuously produces steel, the operating time of the motor 5 is long and the period during which the data suitable for the diagnosis of the motor 5 can be extracted (specific load state or no load state) occurs irregularly.

However, the present embodiment is not limited to the steelmaking plant. For example, the present embodiment can also be used for abnormality detection or diagnosis of a traveling motor of a train. The motor operates while the train is running from the time when the first train leaves the garage to the time when the last train returns to the garage. Further, because passengers get on and off the train during business hours, the load of the traveling motor during business hours fluctuates. Even under such circumstances, the current monitoring system 1 of the present embodiment can be preferably used.

Further, although the present embodiment has been described with an example realizing the current monitoring system 1 that uses the current sensor 4, the present embodiment is not limited to the example. Because the present embodiment is a sensor device that extracts only the part desired to be extracted from among the sensor data acquired by the sensor data acquisition unit 20, various sensors (vibration sensor, microphone sensor, acceleration sensor, etc.) may be used instead of the current sensor.

As is clear from the above system configuration and screen configuration, the user interface unit 25 in the sensor terminal 2 constitutes the screen including a display part for displaying information about the signal detected by the sensor and a setting processing part for setting a processing condition for the detection signal, presents the screen to the master unit 3 side, holds the processing condition set by the user using the setting processing unit in the user interface unit 25, and reflects the processing condition in the signal detection and processing in the user interface unit 25. This means that the sensor terminal 2 is provided with processing condition setting means and display means.

In the first embodiment, an example of displaying on the master unit side is shown; however, a configuration in which the user interface unit 25 is provided with a monitor and an input/output unit and various settings can be made therefrom can be made. As a result, the user can perform various types of processing on the working site side in addition to various types of processing from the distant master unit.

Second Embodiment

In the first embodiment, an example in which the user creates the extraction data 204 and the extraction conditions 205 by acquiring the value of the simple analysis result display part 44 on the simple condition setting screen 40A has been described. On the other hand, in a second embodiment, an extraction data creation unit 30 is provided, and extraction data 204 is created by the extraction data creation unit 30, so that the user can intuitively create the extraction data 204.

Hereinafter, the second embodiment is described with reference to FIGS. 3, 9 and 10. Hereinafter, those having the same configuration and function as in the first embodiment are designated by the same reference numerals, and detailed descriptions thereof will not be repeated.

Figure 9:
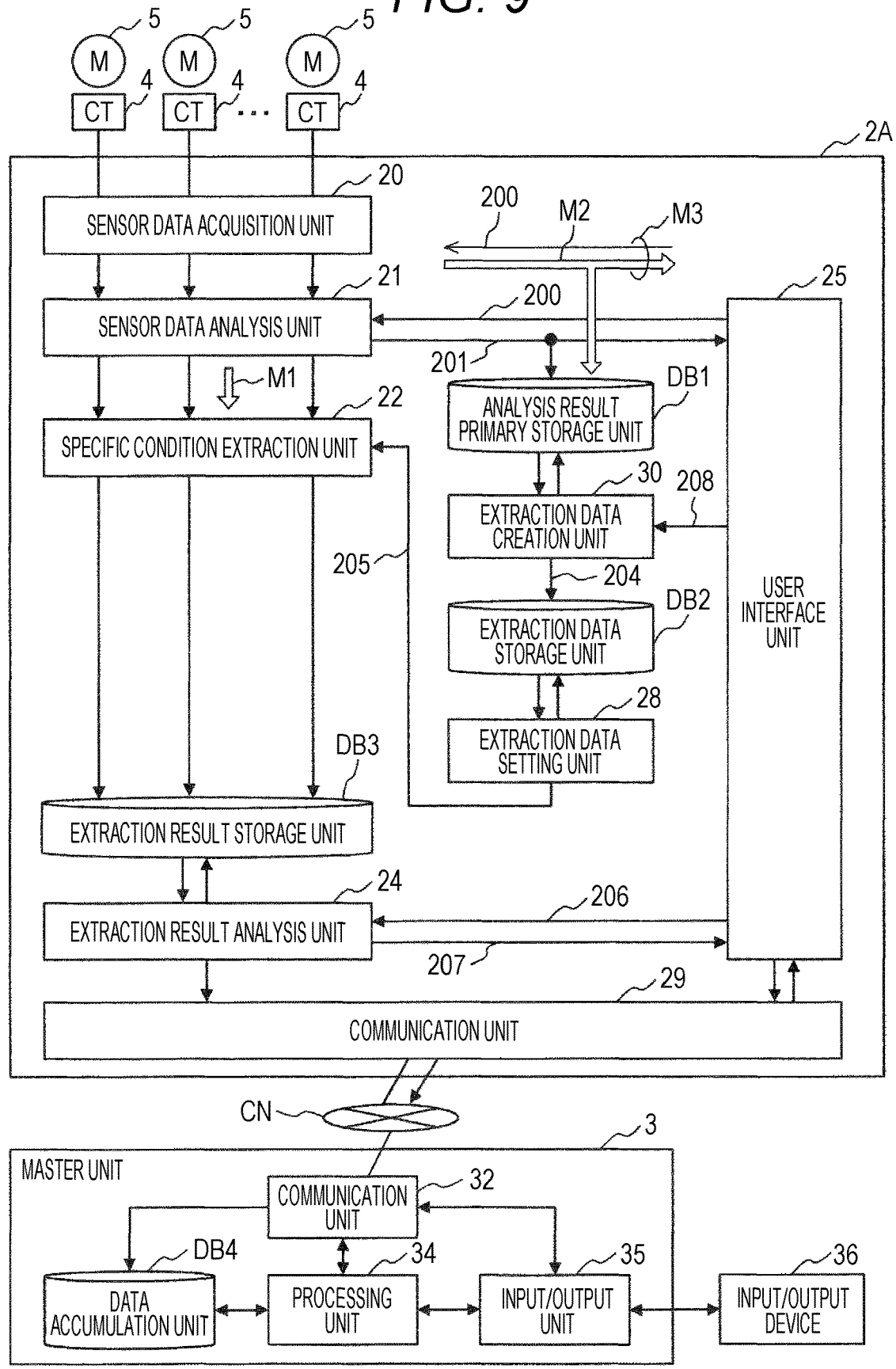
FIG. 9 is a diagram showing an overall configuration example of a current monitoring system according to a second embodiment.

FIG. 9 is an overall configuration diagram of a current monitoring system 1A according to the present embodiment. This overall configuration is basically the same as the configuration in FIG. 2, but is different from the first embodiment in that the extraction data creation unit 30 has been added, and the extraction data creation unit 30 is involved in an analysis result temporary storage unit DB1 and an extraction data storage unit DB2.

The extraction data creation unit 30 added in the second embodiment receives a creation start signal 208 transmitted from a user interface unit 25 when an extraction data creation button 47 is pressed, and then creates the extraction data 204 using a simple analysis result 201 in an analysis result primary storage unit DB1. Note that the creation start signal 208 is assumed to include information indicating whether or not a check box 49, which is the extraction data use/unuse selection means, is checked.

Figure 10:
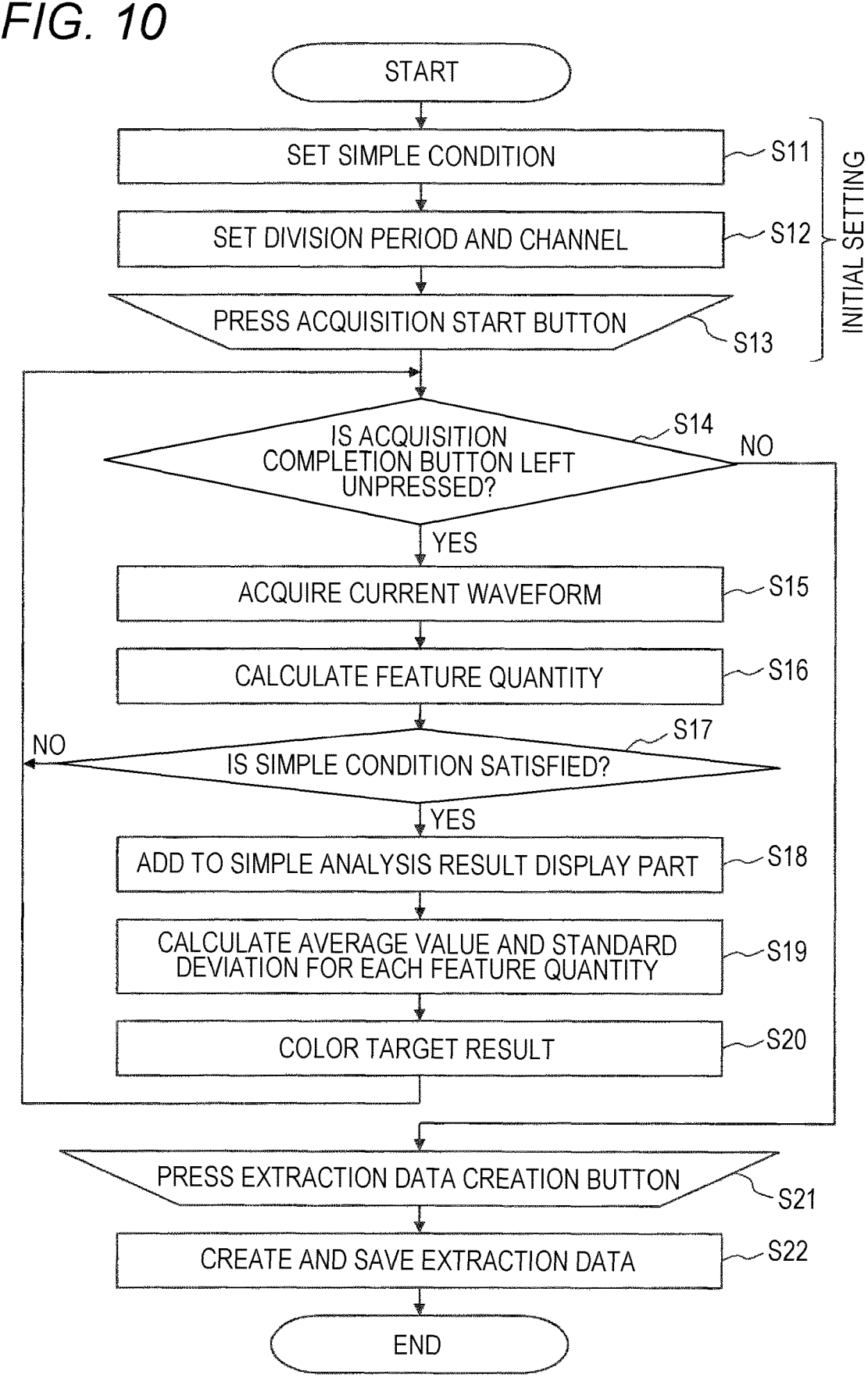
FIG. 10 is a diagram showing an example of a flowchart showing processing of a sensor terminal according to the second embodiment.

FIG. 10 shows the processing of a current sensor terminal 2 according to the present embodiment. The flowchart shown in FIG. 10 newly includes processing steps S19 and S20 for visualizing variations to the user and processing steps S21 and S22 for creating the extraction data 204 by the extraction data creation unit 30, after a series of processing of the flowchart shown in FIG. 4 The other processing steps S11 to S18 are the same in the first embodiment and the second embodiment.

Figure 4:
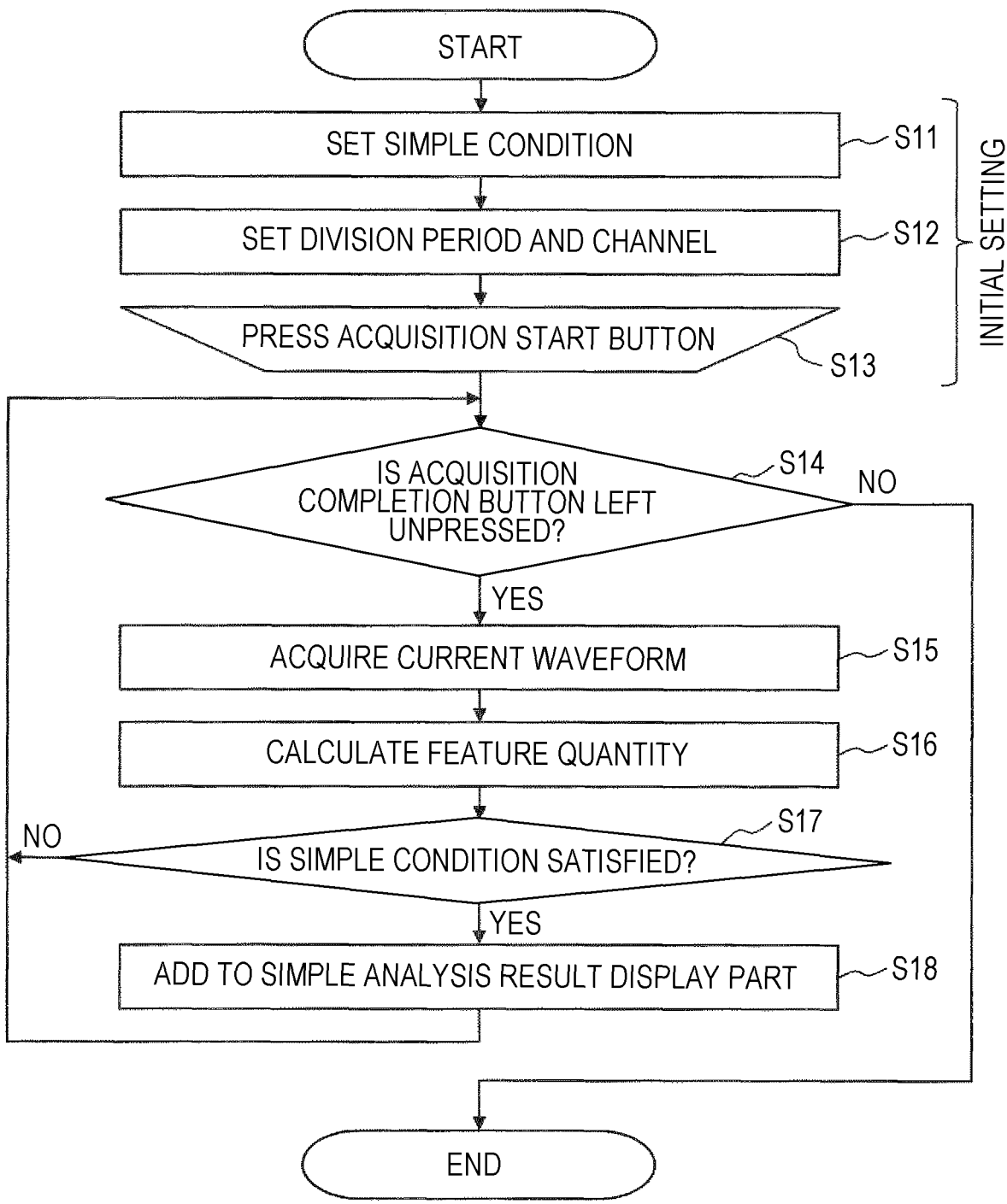
FIG. 4 is a diagram showing an example of a flowchart showing processing of a sensor terminal according to the first embodiment.

In the processing flow of FIG. 10, after a series of processing of the processing flow of FIG. 4 (after the processing of processing step S18), the user interface unit 25 calculates the average value and the standard deviation for each type of feature quantity in a simple analysis result display part 44 (processing step S19). Next, a simple analysis result 201, which is the value of the mean value±standard deviation, is colored and displayed (processing step S20). By doing so, the simple analysis result 201 with little variation can be visualized for the user. Accordingly, the user can easily exclude the simple analysis result 201 having a large variation from the extraction data. The coloring condition is not limited to the above, and the part of the standard deviation may be any value.

When an acquisition completion button 46 is pressed, the processing proceeds to the processing step S21, and the user interface unit 25 waits until the extraction data creation button 47 is pressed by the user. The user checks the check box 49 corresponding to the simple analysis result 201 desired to be used for the extraction data, and then presses the extraction data creation button 47.

When the extraction data creation button 47 is pressed, the process proceeds to the processing step S22, and the user interface unit 25 transmits the creation start signal 208 to the extraction data creation unit 30. Upon receiving the creation start signal 208, the extraction data creation unit 30 creates the extraction data 204 as described above and stores the extraction data 204 in the extraction data storage unit DB2.

The second embodiment configured in this way also has the same effect as that of the first embodiment. Further, in the present embodiment, by the user selecting the extraction data via the simple condition setting screen 40A and the extraction data creation unit 30 creating the extraction data 204, the trouble of creating the extraction data by the user can be reduced.

Third Embodiment

In the first embodiment, an example in which the simple analysis result 201 is acquired by setting the simple condition 200 has been described. On the other hand, in a third embodiment, a data acquisition signal receiving unit 31 is provided in a communication unit 29, and when the data acquisition signal receiving unit 31 receives a data acquisition signal, a simple analysis result 201 is acquired.

Figure 11:
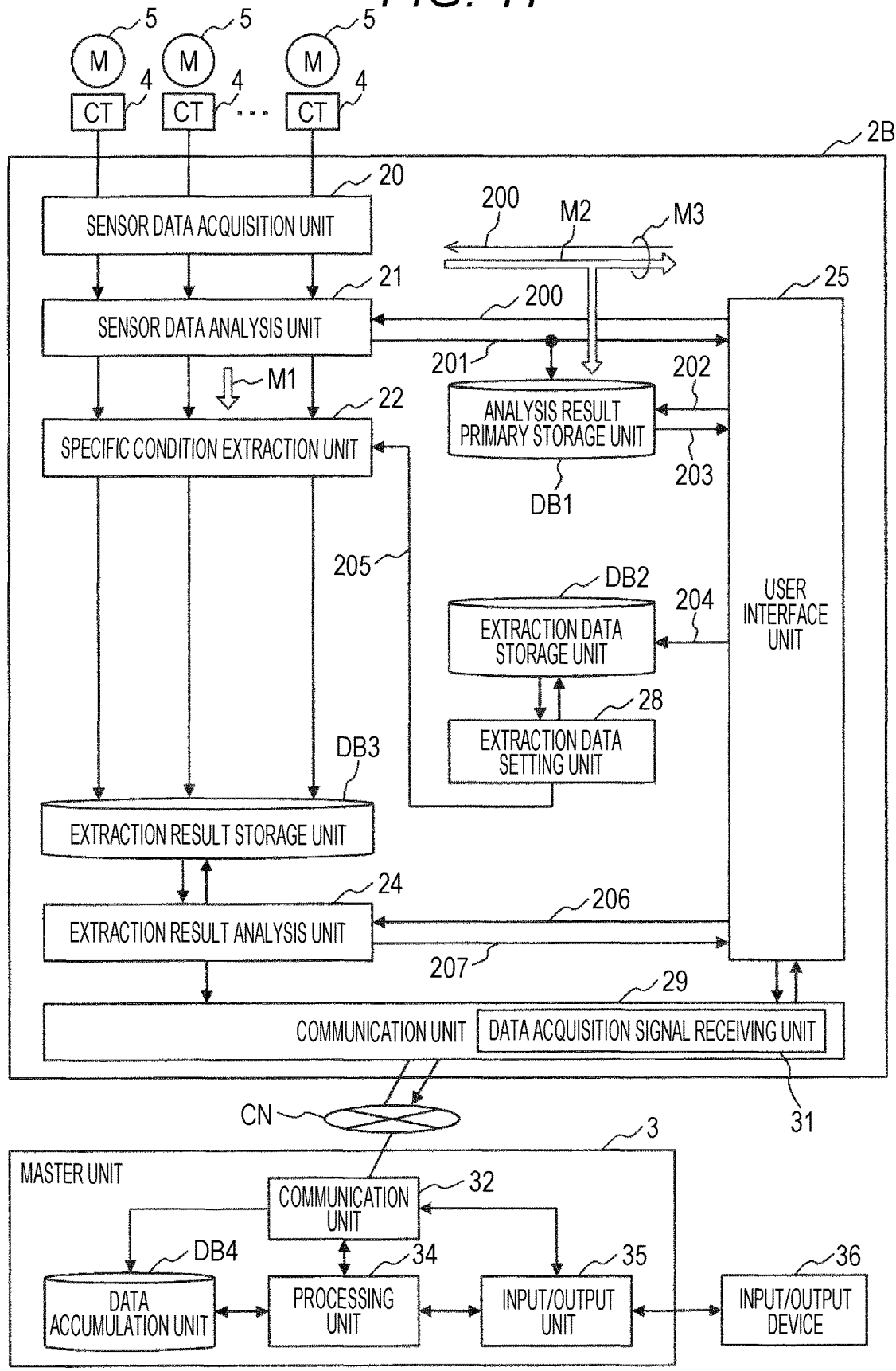
FIG. 11 is a diagram showing an overall configuration example of a current monitoring system according to a third embodiment.

FIG. 11 is an overall configuration diagram of a current monitoring system 1B according to the present embodiment. As compared to the configuration shown in FIG. 2, the configuration shown in FIG. 11 has the data acquisition signal receiving unit 31 in the communication unit 29. When the data acquisition signal receiving unit 31 receives the data acquisition signal, the data acquisition signal receiving unit 31 transmits the data acquisition signal 209 to a sensor data analysis unit 21 via a user interface unit 25.

While receiving the data acquisition signal 209, the sensor data analysis unit 21 transmits the simple analysis result 201, which is a feature quantity, to the user interface unit 25 and meanwhile, stores the simple analysis result 201 in the analysis result primary storage unit DB1.

The third embodiment configured in this way also has the same effect as that of the first embodiment. Further, in the present embodiment, because the acquisition condition is determined by the data acquisition signal transmitted from the outside of the current sensor device 2, the plurality of current sensor devices 2 can simultaneously acquire the simple analysis result 201 at the same time.

Further, for example, in the case of a centralized management device in which the master unit 3 manages the operating state of the steelmaking plant, it becomes possible to acquire the simple analysis result 201 when the motor 5 is in a predetermined operating state.

As a result, when the motor 5 is in the predetermined operating state, the extraction conditions 205 indicating the part desired to be extracted from among the sensor data acquired by the sensor data acquisition unit 20 can be easily determined.

Any of the constituent elements of the present invention can be chosen or omitted, and an invention having the selected configuration is also included in the present invention. Further, the configurations described in the claims can be combined in addition to the combinations specified in the claims.

What is claimed is:

1. A sensor device comprising:
a processor and a memory storing instructions that when executed cause the processor to perform:
sensor data acquisition that acquires sensor data of a measurement target from a sensor;
sensor data analysis that analyzes the data acquired by the sensor data acquisition;
extraction data setting that sets extraction conditions indicating a part desired to be extracted from among all the sensor data acquired by the sensor data acquisition;
specific condition extraction that extracts a part from among all the sensor data acquired by the sensor data acquisition, based on an analysis result of an analysis made by the sensor data analysis and the extraction conditions set by the extraction data setting; and a user interface that allows a user to input and output information, wherein the user interface is configured to provide a user with simple condition settings by which a simple condition of at least one or more of the extraction conditions among the extraction conditions is set for the sensor data analysis, and the user interface includes a detection result display that displays data satisfying the simple condition in the sensor data analysis.

2. The sensor device according to claim 1, wherein the simple condition setting sets a predetermined threshold value for at least one or more feature quantities as the simple condition.

3. The sensor device according to claim 1, wherein the detection result display displays at least one or more feature quantities.

4. The sensor device according to claim 1, wherein the detection result display displays colors and displays items when a value of each feature quantity is within an average value±standard deviation of feature quantities having an equal value.

5. The sensor device according to claim 1, wherein the user interface further includes extraction data use/unuse selection, and the extraction data use/unuse selection allows the user to select data satisfying the simple condition used for the extraction conditions.

6. The sensor device according to claim 1, further comprising:

the processor further performing extraction result analysis that analyzes sensor data extracted by the specific condition extraction; and a communication unit that outputs data analyzed by the extraction result analysis, wherein the data analyzed by the extraction result analysis contains information of a period during which continuous extraction has not been achieved.

7. The sensor device according to claim 1, wherein the sensor is a current sensor, and the measurement target is a motor used in a steelmaking plant.

8. The sensor device according to claim 2, wherein the feature quantity is any one of a maximum amplitude of a current waveform, an average amplitude of a current waveform, a noise level of a signal, a differential value in an optional time unit, an integral value in an optional time unit, a frequency having an Nth intensity in an optional period and an intensity of the frequency (N is a natural number starting from 1), an intensity of an optional frequency, a frequency with a largest change in an optional period and an intensity of the frequency, a similarity with a learned pattern, a maximum amount of change between different current sensors, a frequency at which change between different current sensors is maximum, and a similarity between different current sensors.

9. A sensor device comprising:

a processor and a memory storing instructions that when executed cause the processor to perform:

sensor data acquisition that acquires sensor data of a measurement target from a sensor;

sensor data analysis that analyzes the data acquired by the sensor data acquisition; and a user interface that allows a user to input and output information, wherein the user interface includes a feature quantity display that displays a feature quantity analyzed by the sensor data analysis, and the feature quantity display that displays at least one of time series data acquired by the sensor data acquisition, one or more spectrograms created from the time series data, and a converted spectrogram obtained by comparing the spectrograms.

* * * * *